(12) United States Patent
LeGraw

(10) Patent No.: US 8,082,200 B2
(45) Date of Patent: Dec. 20, 2011

(54) INFORMATION TRADING SYSTEM AND METHOD

(75) Inventor: G. Stephen LeGraw, Mashpee, MA (US)

(73) Assignee: Mentor Partners, LLC, East Greenwich, RI (US)

( * ) Notice: Subject to any disclaimer, the term of this patent is extended or adjusted under 35 U.S.C. 154(b) by 0 days.

(21) Appl. No.: 12/847,432

(22) Filed: Jul. 30, 2010

(65) Prior Publication Data

US 2010/0293038 A1    Nov. 18, 2010

Related U.S. Application Data

(63) Continuation of application No. 09/754,492, filed on Jan. 4, 2001, now Pat. No. 7,769,621.

(60) Provisional application No. 60/208,807, filed on Jun. 2, 2000.

(51) Int. Cl.
*G06Q 40/00* (2006.01)
(52) U.S. Cl. ........................................................ 705/35
(58) Field of Classification Search .................... 705/10, 705/35
See application file for complete search history.

(56) References Cited

U.S. PATENT DOCUMENTS

| | | | | |
|---|---|---|---|---|
| 4,023,013 A * | 5/1977 | Kinker | | 235/379 |
| 4,591,983 A | 5/1986 | Bennett | | |
| 5,121,496 A | 6/1992 | Harper | | |
| 5,168,446 A | 12/1992 | Wiseman | | |
| 5,257,185 A | 10/1993 | Farley | | |
| 5,297,031 A | 3/1994 | Gutterman | | |
| 5,774,878 A | 6/1998 | Marshall | | |
| 5,794,207 A | 8/1998 | Walker | | |
| 5,855,008 A | 12/1998 | Goldhaber | | |
| 5,870,724 A | 2/1999 | Lawlor | | |
| 5,893,079 A | 4/1999 | Cwenar | | |
| 5,897,619 A | 4/1999 | Hargrove, Jr. | | |
| 5,907,831 A | 5/1999 | Lotvin | | |
| 5,913,202 A | 6/1999 | Motoyama | | |
| 5,950,173 A | 9/1999 | Perkowski | | |
| 6,009,412 A | 12/1999 | Storey | | |
| 6,049,783 A | 4/2000 | Segal | | |
| 6,058,417 A | 5/2000 | Hess | | |
| 6,061,663 A | 5/2000 | Bloom | | |
| 6,070,150 A | 5/2000 | Remington | | |
| 6,081,793 A | 6/2000 | Challener | | |
| 6,092,197 A | 7/2000 | Coueignoux | | |
| 6,253,188 B1 | 6/2001 | Witek | | |

(Continued)

OTHER PUBLICATIONS

Health care strategic management; "Healtheon continues to consolidate clout, forges alliance with News Corp."; Feb. 2000, v18, ISSN: 0742-1478.*

(Continued)

*Primary Examiner* — Alexander Kalinowski
*Assistant Examiner* — Edward Chang
(74) *Attorney, Agent, or Firm* — Lando & Anastasi, LLP

(57) ABSTRACT

A system and method of collecting and trading statistical information between users is disclosed herein. In one embodiment, the information is traded via a network, such as the Internet. The method for trading information includes the step of collecting information from a user at a first location, having a confidential data portion and an exchange data portion. Only the exchange data portion is transmitted to a central location. An exchanged data set is defined at the central location. The exchange data set is updated using the exchange data portion. An output data set is determined from the exchange data set, wherein the output data set is accessible by one or more users.

23 Claims, 18 Drawing Sheets

U.S. PATENT DOCUMENTS 6,330,610 B1 * 12/2001 Docter et al. .................. 709/229
6,434,533 B1 *  8/2002 Fitzgerald ........................ 705/10

OTHER PUBLICATIONS

Bond, Bruce; "The return of timesharing in ERP"; May 1999, v122n5, ISSN: 0361-0853.*

Thomas, Jacqueline; "WellMed Partners with MedTouch Internet Health Servcie; Health Profiling software helps individuals mange personal health risks"; Jun. 22, 1998, Business Editors, Portland, Ore.*

"Rules of Engagement," Apr. 11, 1999, Sunday Times, London (UK), p. 14 (5 pages).

Reed, Paul, "Business Brokers Bag Buyers." Journal of Business. Spokane: May 12, 1994. vol. 9, Iss. 9; Sec. 1. p. 1 (8 pages total).

Business Editors, Hi-Tech Writers. "IBM Fires-Up e-business Consulting Services for Small and Medium Businesses" Business Wire. New York: Jul. 21, 1999. p. 1.

PR Newswire Association Inc. "Mellon Bank to Install Fair, Isaac's Search and StrategyWare Products" Mellon Bank Corp. Nov. 17, 1998. p. 4522.

PCT International Search Report for International Application No. PCT/US01/17379 mailed on Oct. 29, 2001 (3 pages).

* cited by examiner

| | Input Control | Consolidated Total | Main Division | Division One | Division One | Other Divisions |
|---|---|---|---|---|---|---|
| 304 → | *Deal Based Operating Data*<br>1    Sales/Revenue<br>2    Earnings B4 Int., Tax, Depr., & Amort (EBITDA) | | | | | |
| 306 → | *Book Value-Financials Acquired/Sold Company*<br>3    Asset<br>4    Payables & Accruals<br>5    Bank Debt or Secured Debt<br>6    All other amortizing debt<br>7    All Other Debt<br>S    Book value of fixed equity instruments<br>      Computed Book of Enterprise:<br>        All Debt Capital<br>        Other Equity<br>        Equity Book Value<br>        Enterprise Book Value<br>        Book Multiple of EBITDA | | | | | |
| 308 →<br><br>Exchange Portion (transmitted) | *Transaction Data*<br>    Stock or Paper Deal<br>      Common Paper<br>9    Common Shares Outstanding<br>10   Shares bought or sold<br>11   Price Paid per Share<br>     or<br>12   Amount paid for Common<br>      % of common acquired<br>    Fixed Equity Instruments<br>      % of book was 100%?<br>13   If< 100%: amount paid for face instrument<br>    All Debt excluding trade payables & accruals<br>      % of book was 100%?<br>14   If< 100% amount paid for face instrument | | | | | |
| 310 → | *Asset Deal*<br>    Deal Basis<br>15   Price Paid for all the assets<br>      Were Payables & accruals assumed<br>      % of book was 100%<br>16   If<100%: amount assumed<br>    Financing Structure<br>17   Interest bearing Debt<br>18   Other Equity<br>19   Equity Invested<br>    Computed Post Acquisition Enterprise Value<br>      All Debt Capital<br>      Other Equity<br>      Equity Book Value<br>      Enterprise Value Paid<br>      Book Multiple of EBITDA | | | | | |

BENCHMARKING INFORMATION FINANCIAL STATEMENT - EDIT TEMPLATE (300, 302)

Fig. 13

| | Input Control | Consolidated Total | Main Division | Division One | Division One | Other Divisions |
|---|---|---|---|---|---|---|
| 354 Confidential Portion (Not transmitted) | *Confidential Identifying Data*<br>1  Company Name<br>2  Address<br>3  City<br>4  State<br>5  Zip Code<br>6  Country<br>7  Country Code<br>8  CEO<br>9  CFO | | | | | |
| 359 | 356 → *Master Data*<br>10  Standard Industrial Index<br>11  International Industrial Index<br>358 → *Subscriber Data*<br>12  Registration Number<br>13  User Password<br>      Transmit Fingerprint | | | | | |
| 361 Exchange Portion (transmitted) | 360 → *Operating Data*<br>1  Sales/Revenues<br>2  Gross Profit<br>3  Operating Profit<br>4  Depreciation<br>5  Amortization<br>6  CEO Compensation<br>7  Property Rents<br>362 → *Assets & Working Capital*<br>8  Assets<br>9  Accounts Receivable<br>10  Inventories<br>11  Equipment (net)<br>12  Intangibles<br>13  Payables & Accruals<br>368 → *Financing*<br>14  Interest bearing Debt<br>15  Other Debt<br>16  Other Equity<br>17  Equity Invested | | | | | |

Title: BENCHMARKING INFORMATION TRANSACTION - NEW TEMPLATE (350, 352)

Fig. 14

| INDUSTRY AVERAGE DEAL AND VALUATION | INDUSTRY AVERAGE COLLATERAL |
|---|---|
| Enterprize Value | Book Value |
| Enterprise Book | Liquidation Value % |
| Book Multiples | |
| EBITDA Annualized | AR Liquidation % |
| EBITDA % Of Sales | INV Liquidatoin % |
| EBITDA Est. V. Actual EBITDA | Equipment & RE Appraisal |
| EBITDA Market Multiples | EBITDA |
| Perpetuity Growth Rate Assumed | Enterprise Value |
| WACC %, No Growth | Add: Trade Payables & Accruals |
| WACC %, With Growth | Less : Liquidation Values |
| Cost Of Equity Capital | *Accounts Receivable* |
| Deal Capital Structure | *Inventory* |
| *Revolving Debt* | *Equipment & Real Estate* |
| *Amortizing Debt + Current Maturities* | Free Cash Value (i.e.airball) |
| *Other Interest Bearing or 3rd Party Debt* | All Debts As % Of Assets |
| *Other Fixed Value Equities* | All Debts- % Of Enterprise Value |
| *Common Equities & Retained Earnigs* | Airball Debt |
| *Total* | Airball % Of Revelent Collateral |
| Financing Multiple Layering | |
| *Traditionally Secured Debt* | |
| *Mezzanine* | |
| *Equity* | |

| INDUSTRY AVERAGE DEAL AND VALUATION | INDUSTRY AVERAGE COLLATERAL |
|---|---|
| Assets | Sales |
| Sales | *Days In Working Capital* |
| *Assets As A % Of Sales* | *Days In Accounts Receivable* |
| *Gross Profit Margine %* | *Days In Inventory* |
| *Operating Profit Margin %* | *Days In Payables & Accruals* |
| *EBITDA %* | Plant & Investment % Of Sales |
| CEO Pay As % Of Sales | Plant & Investment % Of Assets |
| Property Rents As % Of Sales | Depreciation % Of Sales |
| Deprec. & Amort. As % Of Sales | Enterprise Book Value |
| Statement Assurance | Enterprise Market Value |
| Public v. Private Company | Goodwill Value |

Fig. 15

INFORMATION TRADING SYSTEM AND METHOD

CROSS-REFERENCE TO RELATED APPLICATIONS

This application is a continuation of and claims priority under 35 U.S.C. 120 to U.S. patent application Ser. No. 09/754,492, entitled "INFORMATION TRADING SYSTEM AND METHOD," filed on Jan. 4, 2001, which claims priority under 35 U.S.C. §119(e) U.S. Provisional Application Ser. No. 60/208,807, entitled "INTERACTIVE INTERNET STATISTICAL INFORMATION TRADING SYSTEM AND METHOD," filed on Jun. 2, 2000, both of which applications are incorporated herein by reference in their entirety.

THE FIELD OF THE INVENTION

The present invention generally relates to an information trading system and method, and more particularly, a system and method of collecting and trading statistical information between users, which may be traded via a network, such as the Internet.

BACKGROUND OF THE INVENTION

Valuation is the process of determining the economic worth of an asset at a particular point in time. Value is ultimately determined by what a willing buyer pays a willing seller for the asset, i.e., price, during an actual sale transaction. Often, asset value must be estimated absent an actual sales transaction for any one of a number of reasons. In fact, prior to an actual sale, both buyer and seller of the asset arrive at an independent value for the asset as part of the process for reaching a mutually agreed-to sale price.

Value is a relative measure with respect to the marketplace's supply and demand of identical and alternative items to the one being valued. Asset valuation is generally a subjectively applied process of first defining the characteristics of the asset to be valued and comparing them to assets with similar characteristics. This process is commonly known as benchmarking. Benchmarking can also be applied to non-economic items such as process performance wherein characteristics of the process to be evaluated are compared versus similar processes to determine relative efficiency or relative quality (i.e., ranking). For example, attributes such as speed, satisfaction or growth are measurable, non-economic attributes.

Assets, such as business enterprises, are valued by comparison with known values of similar business. Generally, similarity is determined by size, type of business activities or products, geographic location, type of ownership structure, etc.

Rather than compare the business asset under evaluation to individual business assets of known value, a population of similar known-value assets is frequently summarized using statistical methods familiar to those skilled in the art. The asset to be valued is subsequently compared to the summary statistical information. The Standard Industrial Classification (SIC) system is a series of number codes that attempts to classify all business establishments by the types of products or services they make available. Establishments engaged in the same activity, whatever their size or type of ownership, are assigned the same SIC code. More recently, the North American Industry Classification System (NAICS), a major revision to the SIC, provides for newer industries and reorganizes the categories on a production/process-oriented basis. With regard to valuation, comparisons can be easily made to those business classified with the same or similar SIC codes as the business being valued.

Comparative information, such as industry averages and valuation multiples, are collected into databases and either sold or distributed to dues paying members of the collecting agency. This information is collected by many different groups and the demand for it is scattered into various fragmented parties. While Certified Public Accountants (CPAs) and other valuation specialists may demand statistical averages for purpose of valuing a business, a bank may only be interested in operating averages.

Time is another critical factor when valuing items where either the item being valued or the comparison population constituents are dynamically changing with time. The marketplace can change during the time during which the analysis occurs, introducing error in the accuracy of the resultant valuation with respect to the marketplace at the time of the result. Faster analysis yields more accurate results.

One example of an asset which is difficult to value is a privately owned business enterprise. Business enterprises are unique in size, location, and function. Value is not routinely ascertained and reported, as is the case for publicly held businesses subject to securities reporting requirements. Generally, value is determined only for the purposes of ownership transfers, by definition, a private event between transferee and transferor. Sales transaction information involving private companies or businesses is generally not available such that it may be used as a benchmark for defining the value similar private businesses.

One source for comparative financial data is a commercial database company. There are several database companies collecting data under different approaches. The data is organized into a database, perhaps categorized and/or classified, and made available to interested parties. Typically these databases are indexed and searchable. The databases are made available via conventional paper printing, more recently via CD electronic storage media, as well as on-line access. Examples of such business services include Price Waterhouse Coopers-Corporate financial Information by Industry Description, Price Waterhouse Coopers-Edger Scan™: an intelligent interface to the SEC. Dun and Brad Street (D&B) has created a database by gathering business information from public sources such as state and federal government agencies, newspapers, publications and electronic news services and survey. Edger Scan is an interface to the United States Securities and Exchange Commission Electronic Data Gathering Analysis and Retrieval Filings.

Database companies collect data under different approaches. The many users each have specialized need, demand and supply cycles are complicated and inefficient. In order to determine the value of a business, an appraiser must first find comparative sales data. The data may be biased because it represents a small sampling of data that was not reported by an impartial third party. Translations or other adjustments in accounting may have also been employed. The data may not have been collected in a scientifically random fashion. Or the data may be far too aggregated to be useful.

Valuation of private or closely held businesses is often difficult due to the lack of liquidity for these interests. Estimates of value can be difficult to obtain in the absence of readily available pricing information, therefore closely held businesses must typically be valued independently. Certified public accountants and business valuation services specialize in valuation of such interest. Typically the value of assets net of liabilities, cash flows generated, similar publicly traded companies and the recent transactions involving similar companies are considered. The level of significance (i.e. controlling vs. minority interest) and the degree to which marketability is impaired also effects value.

There remains a substantial need for an improved system to facilitate receipt and processing of reliable commercial information which is available to users for business purposes.

SUMMARY OF THE INVENTION

The present invention is a network information trading system and method, and more particularly, a system and method of collecting and trading statistical information between users via a network, such as the Internet.

In one embodiment the present invention provides a business method for trading information. The method includes the step of collecting information from a user at a first location, having a confidential data portion and an exchange data portion. Only the exchange data portion is transmitted to a central location. An exchanged data set is defined at the central location. The exchange data set is updated using the exchange data portion. An output data set is determined from the exchange data set, wherein the output data set is accessible by one or more users.

In one aspect, the exchange data is transmitted to the central location via a network. In one aspect, the network is an internet network. In one aspect, the step of determining the output data set includes the step of defining a statistical model. A statistical data set is generated using the exchange data set and the statistical model. The statistical data set is stored as the output data set. The step of collecting information from a user includes the step of defining a web page, and collecting information from the user via the web page. The central controller is accessed via the web page using a login routine, wherein the login routine determines whether a user is allowed to access the central controller.

In another embodiment, the present invention provides a business method for providing commercial statistical data, the method includes the step of collecting commercial data information via a web page from a user. A commercial data record is generated using the commercial data information, including a confidential subrecord and an exchange subrecord. A commercial statistical analysis system is defined having an exchange data set. Only the exchange subrecord is transmitted via a network communication link to the commercial statistical analysis system. The exchange data set is updated using the exchange subrecord. A commercial statistical data set is generated using the commercial statistical analysis system, wherein the commercial statistical data set is accessible by the user. In one aspect, the network includes the Internet. The collected commercial data information includes asset information, public business valuation information, and/or private business valuation information.

BRIEF DESCRIPTION OF THE DRAWINGS

FIG. 13 is a block diagram illustrating one exemplary embodiment of an exchange portion of a graphical user interface private company template used in an information trading system according to the present invention.

FIG. 14 is a diagram illustrating another exemplary embodiment of a graphical user interface private company template used in an information trading system according to the present invention.

FIG. 15 is a diagram illustrating one exemplary embodiment of statistical models defined in a private/public company information trading system according to the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides an information trading system which operates to collect and trade reliable information between users. In particular, in exchange for reliable information received from a user, the user has access to a centralized information exchange system. In one exemplary embodiment disclosed herein, the information trading system according to the present invention is utilized for providing private and/or public company valuation and other benchmarking information to users. In one aspect, the users include "qualified users," wherein a subset or portion of the information stored at the centralized information exchange system is allowed to be updated and accessible only by qualified users. In other aspects, the present information trading system has broad applications to many areas where the collecting and trading of statistical information is useful and valuable (e.g., scientific, financial, and commercial applications).

Information Trading System

Figure 1:
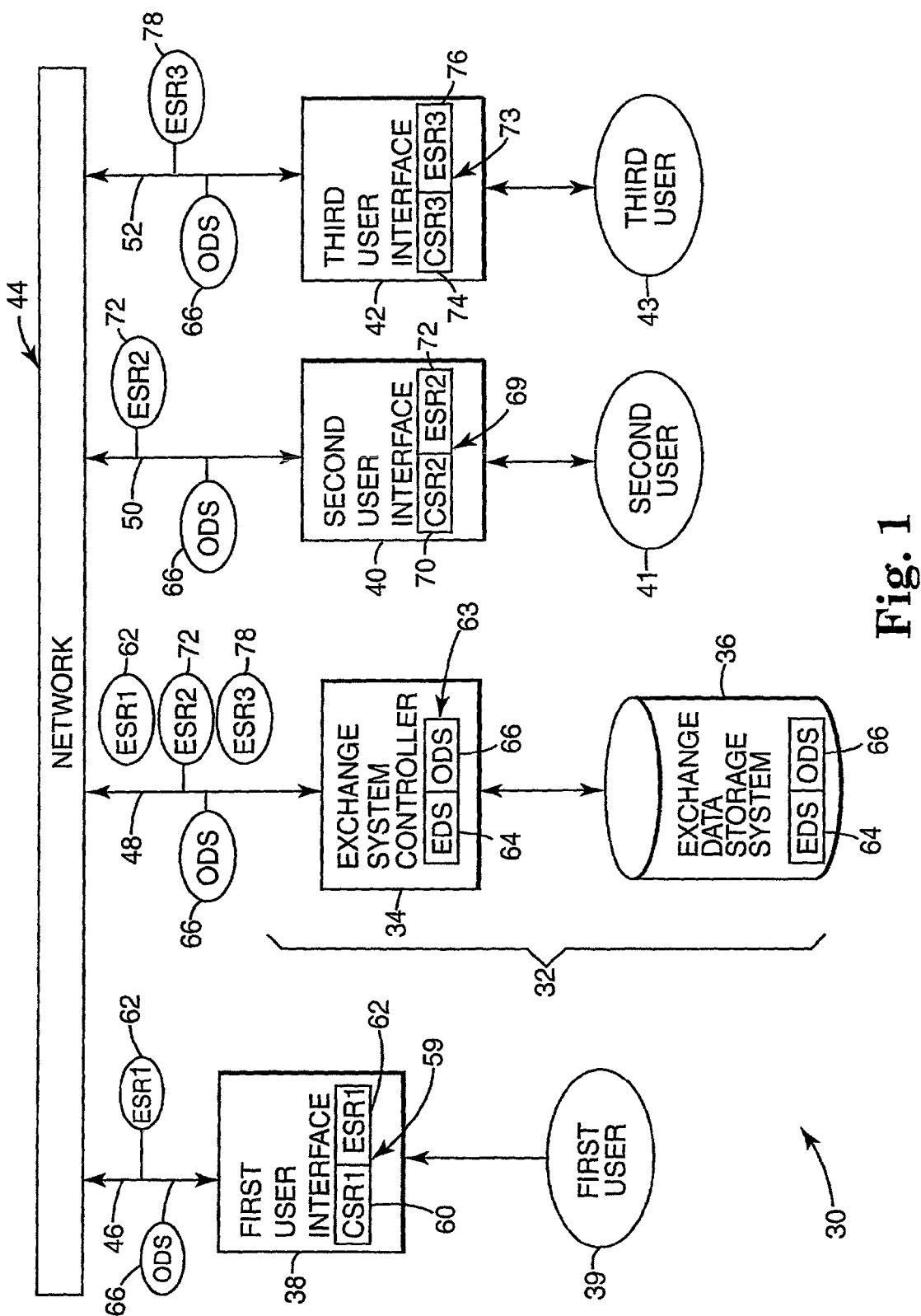
FIG. 1 is a block diagram illustrating one exemplary embodiment of an information trading system according to the present invention.

An information trading system according to the present invention is illustrated generally at 30 in FIG. 1. Information trading system 30 is an interactive information trading system which operates to collect and trade statistical information between users. In one aspect, the information is traded via a network, such as the Internet.

In one embodiment, information trading system 30 includes a centralized information exchange system 32 having an exchange system controller 34 and an exchange data storage system 36. Centralized information exchange system 32 is configured to communicate with one or more users to "exchange" or "trade" information between the users. Further, the centralized information exchange system 32 operates to perform/provide research and analysis on the exchanged or traded information, as desired by the users. In one aspect, the centralized information exchange system or a portion of the centralized information exchange system is allowed to communicate only with a user which is a "qualified user."

In one exemplary embodiment, centralized information exchange system 32 is configured to communicate with a first user 39, a second user 41 and a third user 43 via network 44. In particular, centralized information exchange system 32, first user 39, second user 41 and third user 43 communicate using first user interface 38, second user interface 40, third user interface 42, and network 44 via network communication links 46, 48, 50, 52.

In one embodiment, information is collected from first user 39 at a first location; separate from second user 41 and third user 43. The collected information includes a confidential data portion or confidential subrecord 60 (CSR1) and an exchange data portion or exchange data subrecord 62 (ESR1). After completion of a login routine, only the exchange data portion 62 is transmitted to the centralized information exchange system 32.

Exchange system controller 34 is defined to include an exchange data set 64 and one or more output data sets 66. The exchange data set 64 is updated using the exchange data portion 62 received from first user 39. Output data set 66 is determined from the exchange data set 64. The output data set 66 is accessible by one or more users, including first user 38, second user 40 and third user 42. The exchange data set 64 and output data set 66 can be persistently stored in exchange data storage system 36. In one aspect, the information trading system according to the present invention is a continuous system wherein exchange data set 64 is dynamically updated with each received exchange data portion. In another aspect, exchange data set 64 is updated at set intervals/times or as part of a batch system. Exchange data portions 62 received from users are batched or stored (e.g., in a queue) for a desired or set time period. At the end of the desired time period (e.g., daily, weekly, etc.), the batched data portions are used to update the corresponding exchange data set.

In a similar manner, information is collected from second user 41, the collected information including a confidential data portion or subrecord 70 (CSR2) and an exchange data portion or exchange subrecord 72 (ESR2). Only the exchange data portion 72 is transmitted to the centralized information exchange system 32 via network 44. The exchange data set 64 is updated using the exchange data portion 72. The output data set 66 is determined or updated from the updated exchange data set 64.

Similarly, information is collected from third user 43 at a third location. The collected information includes a confidential data portion or confidential data subrecord 74 (CSR3) and an exchange data portion or exchange data subrecord 76 (ESR3). Only the exchange data portion 76 is transmitted to the centralized information exchange system 32. The exchange data set 64 is updated using the exchange data portion 76. The output data set 66 is determined from the updated exchange data set 64. The output data set 66 is accessible via a defined query by one or more users, including first user 38, second user 40 and third user 42.

Information trading system 30 allows for first user 39 to "trade" or "exchange" information, and in particular, exchange data portion 32, by providing it to centralized information exchange system 32, in exchange for access to output data set 66. Similarly, second user 41 provides exchange data portion 72 to centralized information exchange system 32 in exchange for output data set 66, and third user 42 provides exchange data portion 76 to centralized information exchange system 32 in exchange for access to output data set 66.

Network 44, as used herein, is defined to include an internet network (e.g., the Internet), intranet network, or other high-speed communication system. In one preferred embodiment, network 44 is the Internet. While the exemplary embodiments in the following description refer to the Internet network, it is understood that the use of other communication networks or next generation communication networks or combination of communication networks (e.g., an intranet and the Internet) are within the scope of the present invention.

Information trading system 30, including centralized information exchange system 32 having exchange system controller 34 and exchange data storage system 36, can be implemented in hardware via a microprocessor, programmable logic device, or state machine, in firmware, or in software within a given device. In one aspect, at least a portion of the software programming is web-based and written in HTML and JAVA programming languages, including links to defined spreadsheets for data collection, and each of the main components communicate via network 30 using a communication bus protocol. For example, the present invention may or may not use a TCP/IP protocol suite for data transport. Other programming languages and communication bus protocols suitable for use with the information trading system according to the present invention will become apparent to those skilled in the art after reading the present application. Components of the present invention may reside in software on one or more computer-readable mediums. The term computer-readable medium as used herein is defined to include any kind of memory, volatile or non-volatile, such as floppy disks, hard disks, CD-Roms, flash memory, read-only memory (ROM), and random access memory (RAM).

In one aspect, first user 39 and second user 41 are defined as "qualified" users. A qualified user is a user who meets a set of predefined qualifications such that information obtained from the qualified users is deemed more reliable than information obtained from a user which is not a qualified user. As such, information obtained from first user 39 and second user 41 is considered highly-reliable information, and may be stored separate from information obtained from a "non-qualified" user. In one aspect, third user 43 is a non-qualified user. A non-qualified user is defined as a user who does not meet the requirements for a qualified user. As such, information traded with third user 43 is not deemed as reliable as information received from first user 39 and second user 41. Further, third user 43 may not be allowed access to the same database information as first user 39 and second user 41.

Figure 2:
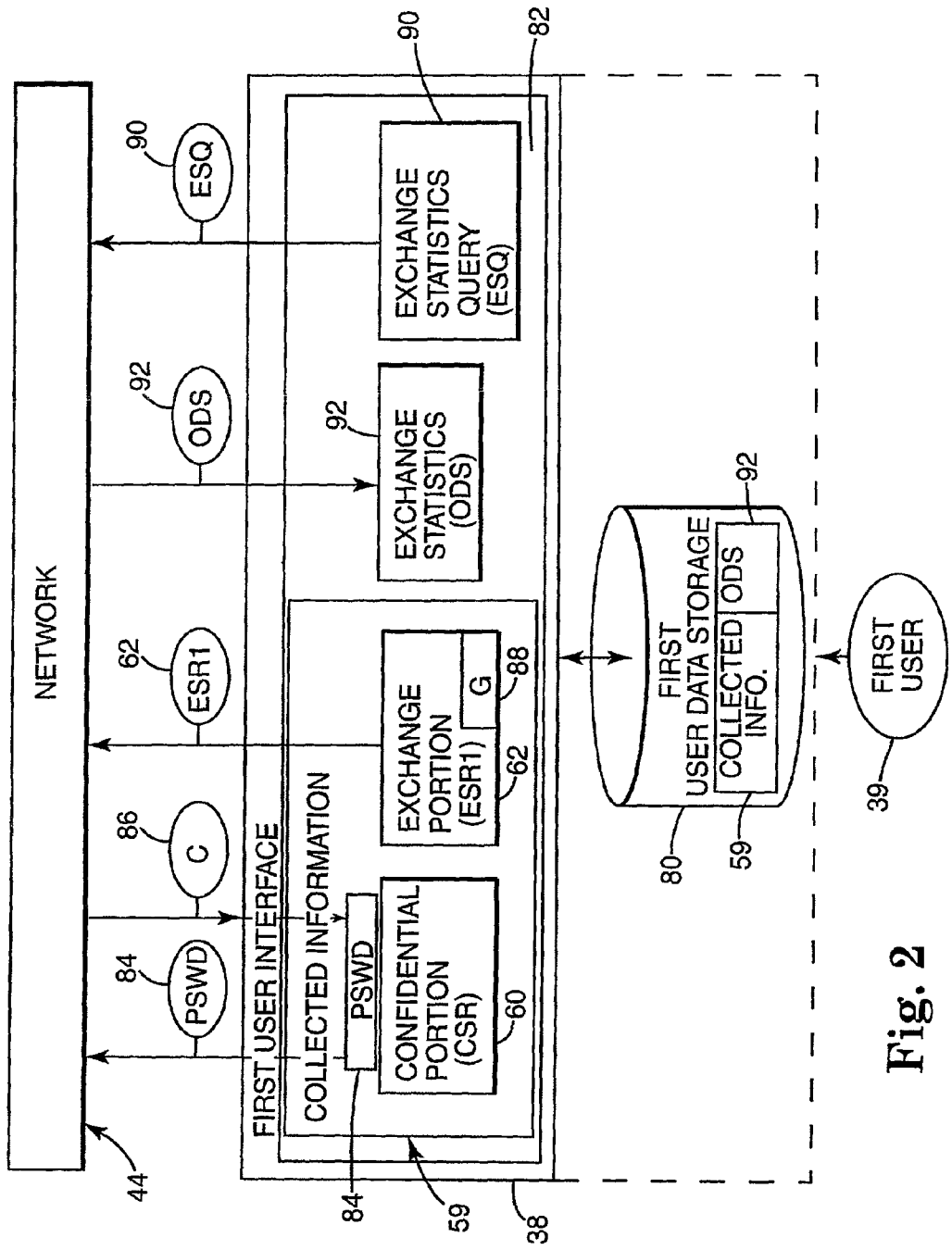
FIG. 2 is a block diagram illustrating one exemplary embodiment of information flow through a portion of the information trading system of FIG. 1.

FIG. 2 is a diagram illustrating one exemplary embodiment of information flow through a portion of information trading system 30 shown in FIG. 1. In particular, first user interface 38 allows for first user 39 to communicate (i.e., exchange or trade information) via network 44 with centralized information exchange system 32. In one embodiment, first user interface 38 is a computer or similar microprocessor based hardware/software device or appliance (e.g., a personal digital assistant (PDA) device). The computer may include, for example, an input device such as a keyboard and/or a mouse and a display device such as a monitor, as is known in the art. As such, the first user interface 38 facilitates the entry of information by first user 39. Other input devices, such as the utilization of a voice recognition system, may be used. First user interface 38 also includes first user data storage 80, for persistent storage of the first user 39's collected and exchanged information. In one aspect, the first user data storage 80 includes a hard disk drive. First user interface 38 may include other memory components to aid in the exchange of data, such as random access memory (RAM), read-only memory (ROM), flash memory, etcetera.

Preferably, the first user interface computer runs on an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. One preferred operating system is a Windows® brand operating system sold by Microsoft Corporation. However, other operating systems which provide windowing environments may be employed, such as those available from Apple Corporation or IBM.

Portion of the information trading system according to the present invention runs on the operating system within first user interface 38. The operating system preferably includes a windows-based dynamic display which allows for the entry or selection of data in dynamic data field locations by first user 39 via an input device such as a keyboard and/or mouse.

In one aspect, collected information 59 is collected from first user 39 and includes confidential portion 60 and exchange portion 62. Only exchange portion 62 is transmitted via network 44 to centralized information exchange system 32. Confidential portion 60 includes confidential identifying data which first user 39 desires not to be transmitted to centralized information exchange system 32. The confidential identifying data may include, for example, a specific name or company name, address, the name of the Chief Executive Officer, and the name of the Chief Financial Officer, etcetera. If known, such information would allow the identification of first user 39 or the origination of the exchange portion 62 to other users having access to the centralized information exchange system.

First user interface 38 includes subscriber data 84 which is unique to first user 39. The subscriber data 84 operates as a password (PSWD) which is unique to first user 39, and operates to allow first user 39 to have access to trading information via centralized information exchange system 32. During a login routine, the subscriber data 84 is transmitted via network 44 to centralized information exchange system 32. The centralized information exchange system 32 has identifying information or passwords stored for each user having "clearance" to access the centralized information exchange system 32. Further, the subscriber data 84 indicates to centralized information exchange system 30 whether the user is a "qualified user" and as such is allowed access to the qualified user exchange data. Once the centralized information exchange system 32 determines that the correct subscriber data has been transmitted for first user 39, a confirmation (C) 86 is returned, indicating that access is allowed and a communication link has been established between the first user interface 38 and the centralized information exchange system 32. Exchange portion 62 can now be transmitted to the centralized information exchange system 32.

Prior to transmitting the exchange portion 62 to centralized information exchange system 32, the information contained within exchange portion 62 is associated with one or more predefined groups (G), indicated at 88. The predefined groups allow for the information within exchange portion 62 to be categorized by the centralized information exchange system 32. In particular, one or more groups are defined within centralized information exchange system 32. First user interface 38 determines the groupings 88 for exchange portion 62 using collected information 59 including confidential portion 60. Once the groupings 88 are determined, the groupings are attached to (and may be part of) exchange portion 62. As such, in lieu of transmitting confidential portion 60 to centralized information exchange system 32, groupings 88 are transmitted as part of exchange portion 62 for the grouping of the data within exchange portion 62 by centralized information exchange system 32. Alternatively, the groupings 88 may be transmitted with the subscriber data 84. The collected information 59 from first user 39, including confidential portion 60 and exchange portion 62, may be persistently stored within first user data storage 80.

In exchange for trading collected information (i.e., the exchange portion 62) with the centralized information exchange system 32, first user 39 may submit a query to centralized information exchange system 32 output data set 92 and receive exchange statistics from the centralized information exchange system 32 in response to the query. In particular, first user interface 38 allows for first user 39 to submit an exchange statistics query (ESQ) 90 (e.g., via a graphical user interface) to centralized information exchange system 32. In response to the exchange statistics query 90, centralized information exchange system 32 transmits via network 44 exchange statistics to the first user 39, indicated as an output data set (ODS) 92. The output data set 92 corresponds to the exchange statistics query 90.

The information trading system 30 is a dynamic information trading system. In exchange for first user 39 to provide information to the centralized information exchange system 32 via exchange portion 62, the first user 39 has access to exchange statistics based on a desired exchange statistics query, which is dynamically updated utilizing the exchange portion 62 provided by the first user 39 and other users. Every time an exchange portion 62 is transmitted to the centralized information exchange system 32, the centralized information exchange system 32 updates its exchange statistics output data set 92. As such, first user 39 may choose to periodically receive an updated exchange statistics output data set 92 which corresponds to a preset desired query. For example, first user 39 may configure first user interface 38 to receive an updated exchange statistics output data set 92 which corresponds to a particular query by first user 39 at each confirmed login or access to the centralized information exchange system 32.

Figure 3:
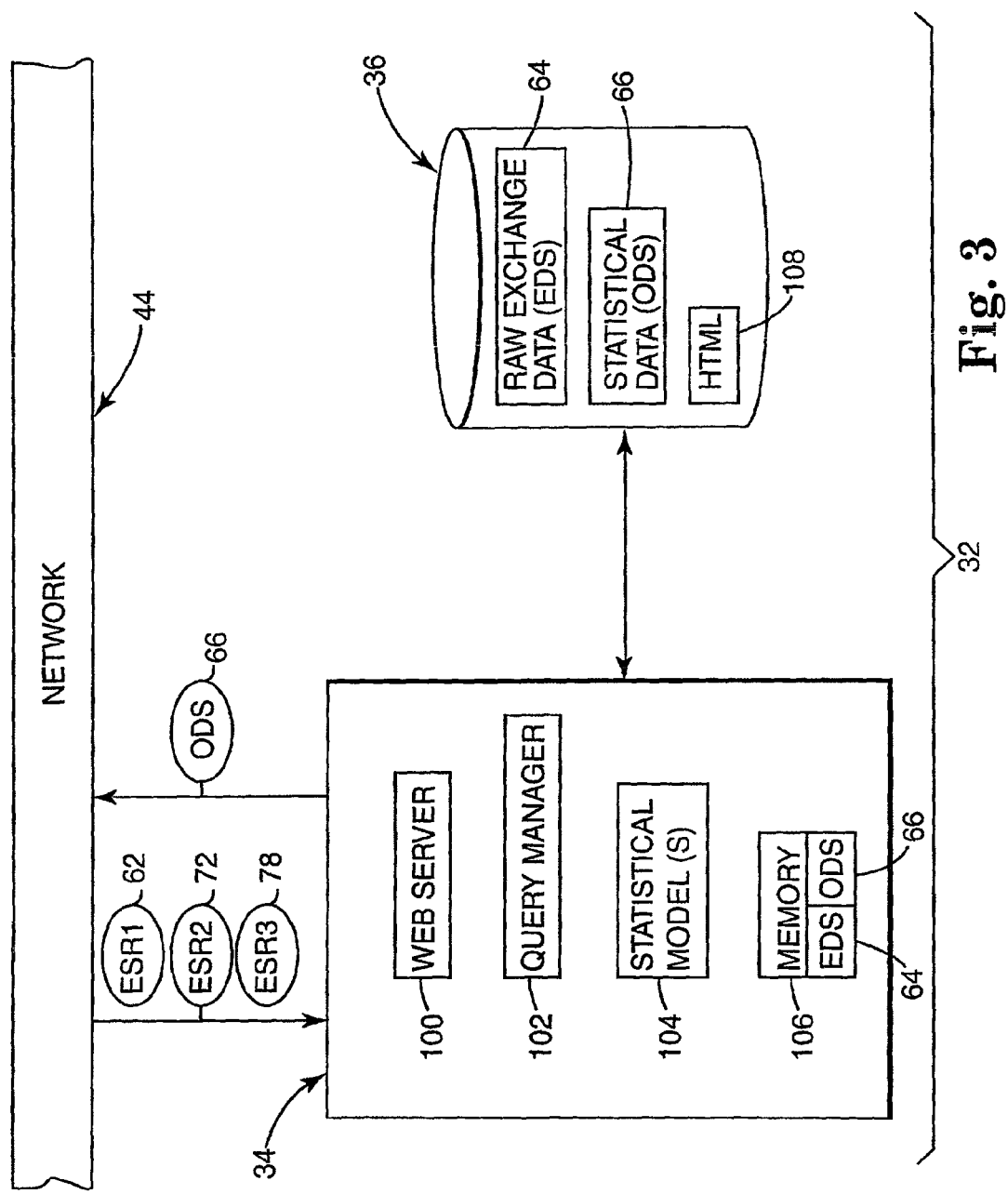
FIG. 3 is a block diagram illustrating one exemplary embodiment of information flow through another portion of the information trading system of FIG. 1.

FIG. 3 is a block diagram illustrating one exemplary embodiment of information flow through another portion of the centralized information exchange system of the information trading system of FIG. 1. In particular, centralized information exchange system 32 includes exchange system controller 34 and exchange data storage system 36. Exchange system controller 34 includes hardware, software, firmware, or a combination of these. In one preferred embodiment, exchange system controller 34 includes a computer server or other microprocessor based system capable of performing a sequence of logic operations. In addition, exchange system controller 34 can include a microprocessor embedded system/appliance incorporating tailored appliance hardware and/or dedicated single-purpose hardware. Exchange system controller 34 also includes other components, such as a memory component (e.g., RAM, ROM, etc.). Exchange data storage system 36 includes non-volatile memory (e.g., a hard disk drive or other persistent storage device) and may also include volatile memory (e.g., random access memory (RAM)). Exchange data storage system 36 operates to store exchange data files which are accessible via exchange system controller 34.

In one aspect, exchange system controller 34 includes a web server 100, a query manager 102, statistical models 104 and memory 106. Web server 100 can be utilized to provide graphical user interfaces to users. In one aspect, web server 100 is utilized to coordinate communication portals between the centralized information exchange system 32 and users via network 44. Query manager 102 operates to manage queries from users based on statistical models 104. Statistical models 104 are predefined statistical groupings or calculations. In particular, as raw exchange data is received from users (e.g., users or qualified users), such as exchange portion 62, exchange portion 72, and exchange portion 78, the statistical models 104 are used with the exchange data to update the statistical data output data set 66. Memory 106 operates to temporarily store exchange data and output data sets 66 generated using the statistical models 104. In one exemplary embodiment, predefined groupings are stored as part of statistical models 104. As exchange data is received, the exchange data is distributed according to the predefined groupings for updating statistical output data sets 66 within those groupings.

Exchange data storage system 36 is utilized to store raw exchange data, indicated at 64, and statistical data 66 accessible by users via query manager 102. Further, exchange data storage system 36 is utilized for storage of other components, such as HTML software 108 utilized by web server 100.

Figure 4:
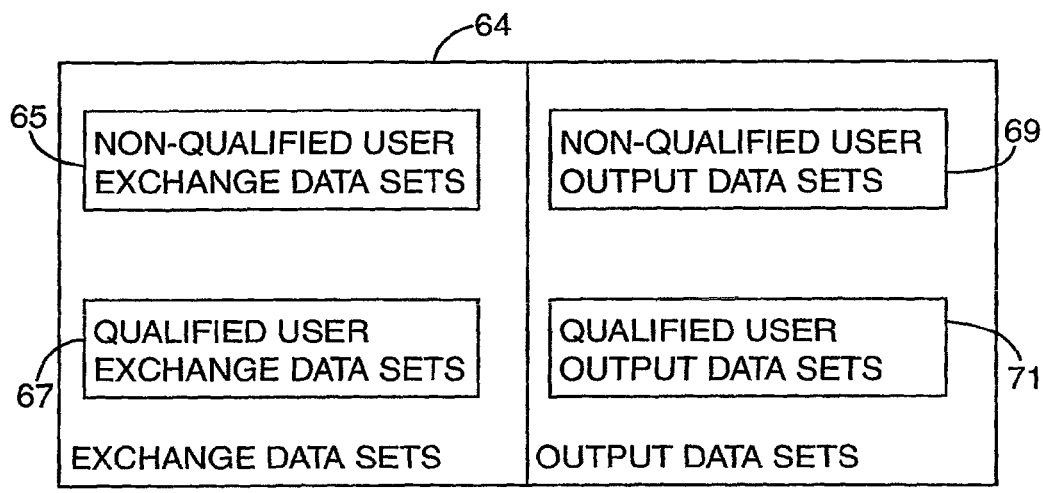
FIG. 4 is a block diagram illustrating one exemplary embodiment of an exchange portion of an information trading system according to the present invention.
Figure 5:
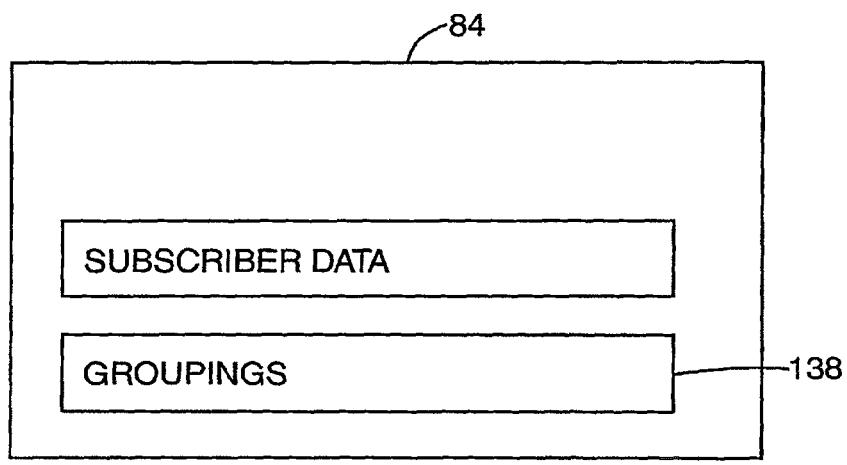
FIG. 5 is a diagram illustrating one exemplary embodiment of an access subrecord used in the information trading system of FIG. 1.

FIG. 4 is a block diagram illustrating one exemplary embodiment of exchange data sets 64 and output data sets 66 of an information trading system according to the present invention. In one aspect shown, exchange data sets 64 include non-qualified user exchange data sets 65 and qualified user exchange data sets 67. In particular, raw exchange data received from non-qualified users is stored in non-qualified user exchange data sets 65. Similarly, raw exchange data received from qualified users is stored in qualified user exchange data sets 67. Output data sets 66 include non-qualified user output data sets 69 and qualified user output data sets 71. In particular, non-qualified user output data sets 69 are generated using statistical models 104 and the raw exchange data stored in non-qualified user exchange data sets 65. Similarly, qualified user output data sets 71 are generated using statistical models 104 and raw exchange data stored in qualified user exchange data sets 67. In one alternative embodiment, raw exchange data received from all users (qualified or non-qualified) is stored in a common group of exchange data sets. As such, common output data sets are generated using the exchange data sets in connection with statistical models 104. FIG. 5 is a diagram illustrating one exemplary embodiment of an access subrecord including subscriber data 84 used in the information trading system according to the present invention. As previously described herein, subscriber data 84 can be utilized as part of a login routine to determine whether a user is allowed to access the centralized information exchange system 32. Additionally, subscriber data 84 may also include groupings 138. The groupings 138 are utilized by the centralized information exchange system 32 for grouping the exchange data traded between a user and the centralized information exchange system 32. For example, groupings for private and public companies may include the standard industrial index or international industrial index associated with the exchange data.

Figure 6:
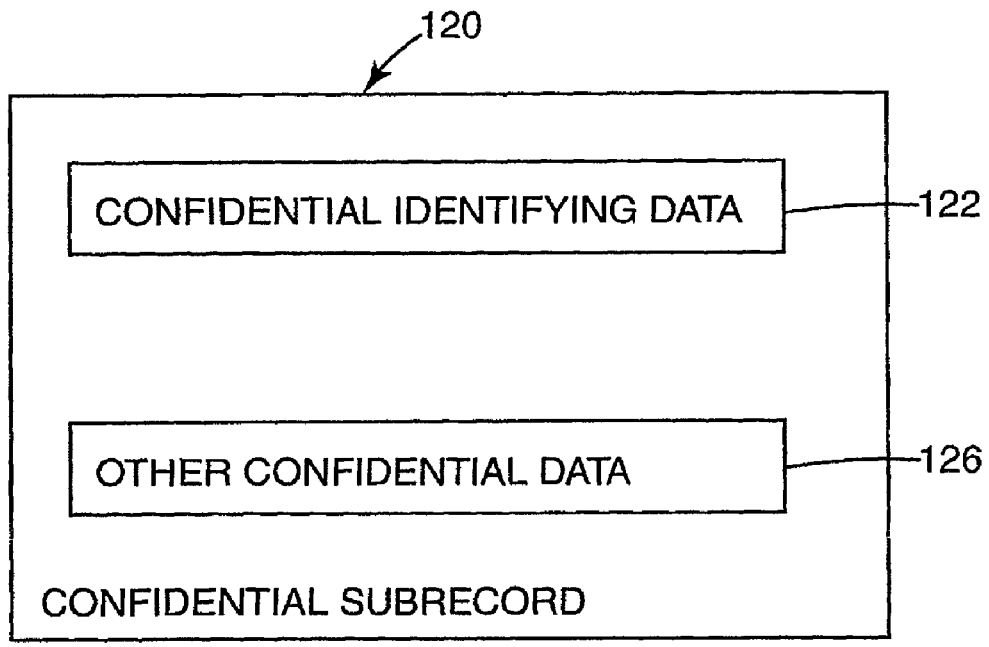
FIG. 6 is a diagram illustrating one exemplary embodiment of a confidential subrecord used in the information trading system of FIG. 1.

FIG. 6 is a diagram illustrating one exemplary embodiment of a confidential subrecord input to a user interface via a graphical user interface by a user, indicated at 120. The confidential subrecord 120 includes confidential identifying data 122, and other confidential data 126. In particular, the confidential identifying data 122 and other confidential data 126 are dynamic data fields which include information provided by each user. Confidential identifying data 122 may include specific information uniquely identifying the company or person associated with the collected information. Other confidential data fields 126 include other confidential data which is not desirable to be transmitted to the centralized information exchange system 32. In one preferred embodiment, the confidential subrecord 120 is stored locally and accessible by the corresponding user.

Figure 7:
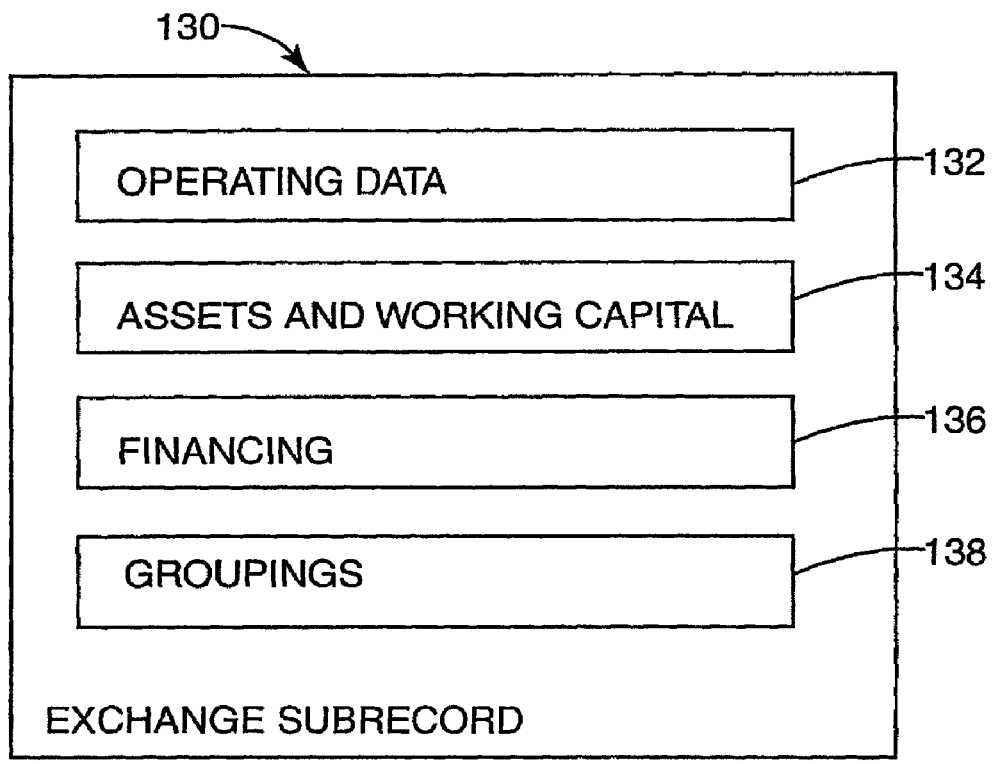
FIG. 7 is a diagram illustrating one exemplary embodiment of an exchange subrecord used in the information trading system of FIG. 1.

FIG. 7 is a diagram illustrating one exemplary embodiment of an exchange subrecord 130 used with an information trading system according to the present invention. The exchange subrecord 130 is transmitted to the centralized information exchange system 32. The exchange subrecord 130 includes dynamically selectable and/or enterable data fields. In the exemplary embodiment shown, exchange subrecord 130 includes operating data 132, assets and working capital 134, financing 136 and groupings 138. The operating data field 132, assets and working capital data field 134, and financing data field 136 are data fields which may be specific to a type of information trading system. Groupings 138 may be associated with exchange subrecord 130. Groupings 138 are predefined groups determinable by the user interface based on the collected information including the confidential subrecord. The groupings 138 are utilized by the centralized information exchange system 32 for categorizing the exchange subrecord 130 without knowledge of the confidential identifying data of confidential subrecord 120. For example, groupings 138 may include a geographic region field associated with the exchange subrecord 130.

Figure 8:
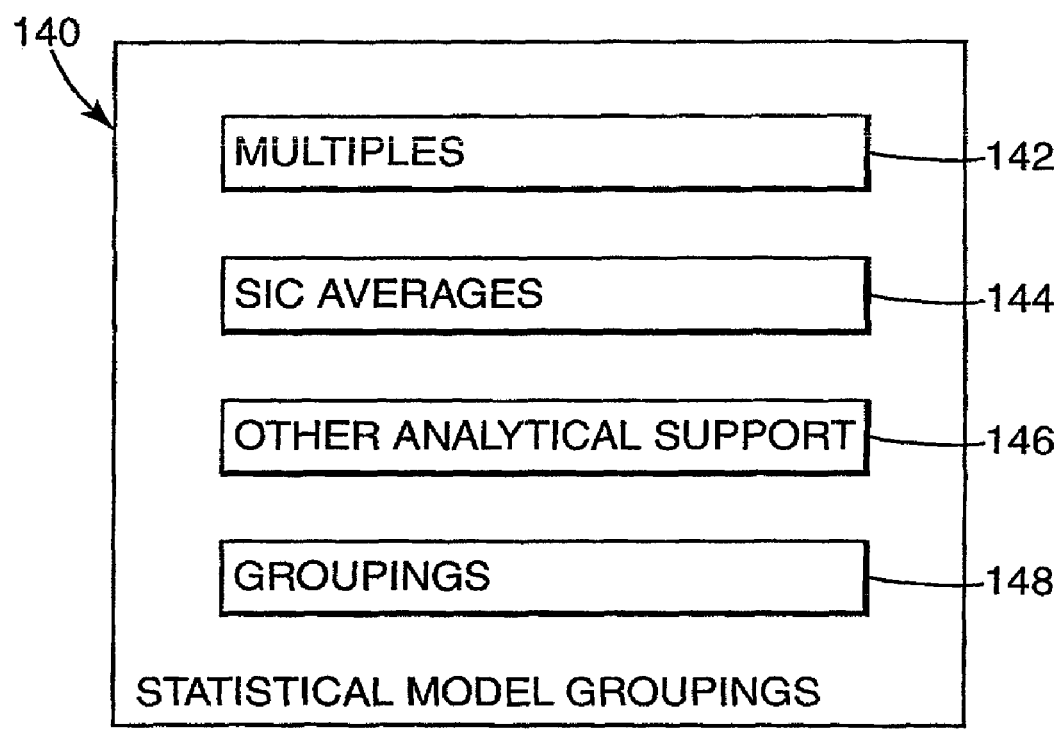
FIG. 8 is a diagram illustrating one exemplary embodiment of statistical model groupings used in the information trading system illustrated in FIG. 1.

FIG. 8 is a block diagram illustrating one exemplary embodiment of statistical model groupings 140 utilized by an information trading system at the exchange system controller. In one exemplary embodiment, the statistical model 140 includes multiples field 142, SIC averages 144, other analytical support 146 and groupings field 148. As such, statistical models are determined for each field type 142, 144, 146. Each field type 142, 144, 146 is further split up within groupings defined at 148. For example, for a grouping 148 identified as a number of geographical regions, each statistical model field 142, 144, 146 is tracked separately for each geographical region group.

Private/Public Company Information Trading System

Figure 9:
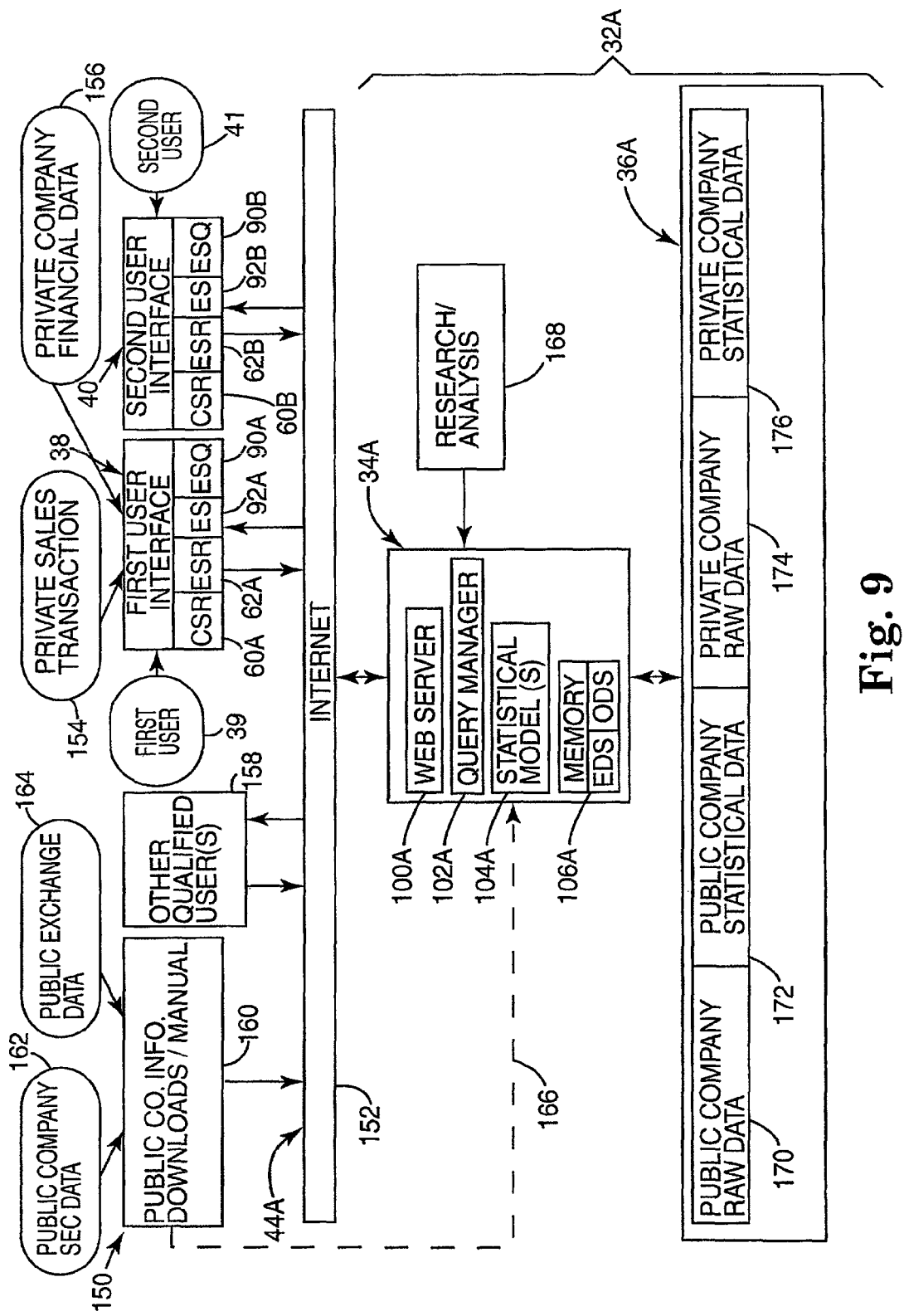
FIG. 9 is a block diagram illustrating another exemplary embodiment of an information trading system according to the present invention.
Figure 10:
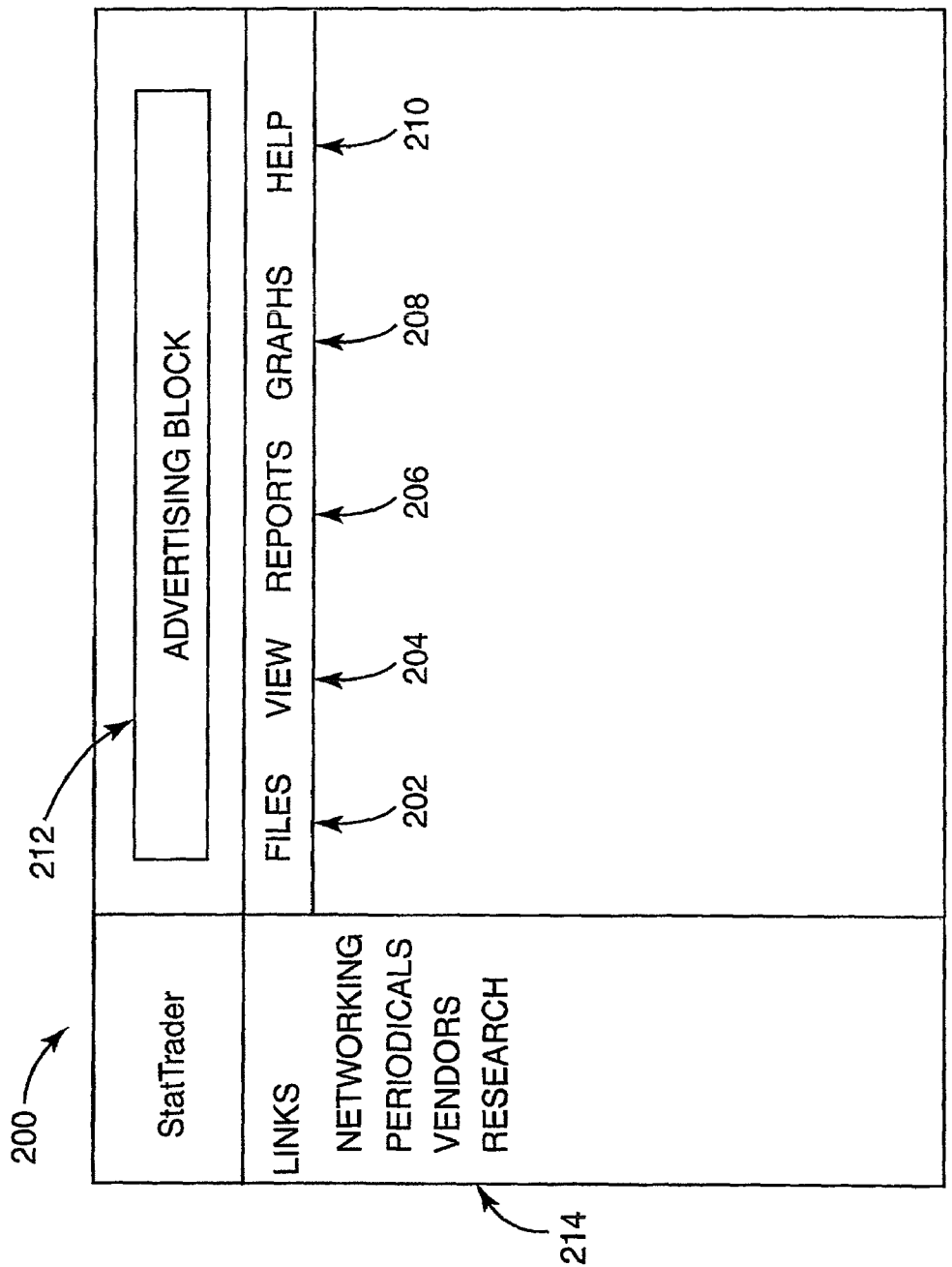
FIG. 10 is a diagram illustrating one exemplary embodiment of a user interface used in an information trading system according to the present invention.

FIG. 9 is a block diagram illustrating one exemplary embodiment of an information trading system according to the present invention is indicated generally at 150. The information trading system 150 is similar to the information trading system 30 previously described herein, and more specifically, is directed to an information trading system for the trading of public company and private company commercial information, which in one embodiment includes company sale transaction and financial data.

In the exemplary embodiment illustrated, private company commercial information is collected from one or more users, represented by first user 39 and second user 41. Network 44 is an internet network, and more particularly, is the Internet, indicated at 152. In one aspect, users 39, 41 are qualified users. Typical qualified users include Certified Public Accountants, loan underwriters, and investors. Other private company and public company commercial information is transmitted between other users 158 and the centralized information exchange system 32 via the internet 152. Other qualified users may include insurance companies, investment banks, brokers and consultants. Non-qualified users may include commercial companies and individual investors.

Information on private company sales transactions 154 is collected from first user 39 via first user interface 38. In one exemplary embodiment, private company financial data 156 is also collected from first user 39 via first user interface 38. Similarly, private company financial data 156 is collected from second user 41 via second user interface 40. Exchange subrecords 62A, 62B associated with the corresponding private company sales transactions 154 and private company financial data 156 are transmitted via the internet to centralized information exchange system 32A.

The collection of public company information is indicated at block 160. The collection of reliable public company information does not depend upon users as a source. In particular, public company information may be obtained through electronic downloads or manual data input. Public company information can be received via reliable data sources. For example, public company SEC data 162 can be obtained from a reliable data source, such as Dunn & Bradstreet. Public exchange data 164 can be obtained from published public exchange market information, such as reported by the New York Stock Exchange (NYSE), the American Stock Exchange (AMEX), and the NASDAQ. Public company information may be transmitted to the centralized information exchange system 32A via the interne 152. Alternatively, the public company information may be directly downloaded to the centralized information exchange system 32A via other direct high-speed communication links, such as a high-speed modem or T1 telephone line communication link, as indicated by dashed line 166. Value added research and/or analysis is provided at the centralized information exchange system 32A. Further, public company raw data 170, public company statistical data 172, private company raw data 174 and private company statistical data 176 are maintained at exchange data storage system 36A. Data stored within exchange data storage system 36A is accessible by research/analysis 168 via query manager 102A. Similarly, information stored at data storage system 36A is accessible by users via query manager 102A.

FIGS. 10 through 15 illustrate exemplary embodiments of graphical user interfaces for one embodiment of the information trading system according to the present invention. The graphical user interfaces are windows based user interfaces utilized when trading information between a user and the centralized information exchange system 32.

In FIG. 8, one exemplary embodiment of a graphical user interface between a user and the centralized information exchange system is shown generally at 200. The graphic user interface 200 is a windows-based graphical user interface, as previously described herein. Graphical user interface 200 includes pull-down menus for accessing portions of the information trading system according to the present invention, including a FILES pull-down menu 202, a VIEW pull-down menu 204, a REPORTS pull-down menu 206, a GRAPHS pull-down menu 208, and a HELP menu 210. Other suitable menus will become apparent to one skilled in the art after reading the present application.

Graphical user interface 200 may include other ancillary components usable by a user. For example, an advertising block component is illustrated at 212. The advertising block 212 provides space on graphical user interface 200 reserved for advertising. The advertising may be general advertising directed to all users of the information trading system. Alternatively, the advertising may be specifically directed to the user using the graphical user interface 200. In particular, based on the information traded between a user and the centralized information exchange system 32, the centralized information exchange system 32 may build a profile of the user. Based on the user profile, specific advertising can be automatically selected by the centralized information exchange system and directed to the user. Additionally, the advertising can be dynamically changed (e.g., at each successful login by a user), via the Internet communication link with the centralized information exchange system 32. The advertising block 212 may further include active fields for linking the advertising contained within the advertising block 212 to a website associated with the advertisement. In particular, if a user would like further information after viewing the advertising, the user can simply click on the active field within the advertising block 212 and be linked to a website associated with the advertisement via the Internet. Similarly, a portion of the graphical user interface 200 may be dedicated to links, illustrated generally at 214. The links 214 provide a user with links to other websites useful to the user. Example links include links for networking, periodicals, vendors and research. The links 214 may be automatically determined by the centralized information exchange system 32 based on the profile of the user. Alternatively, the user may determine the links 214.

Figure 11:
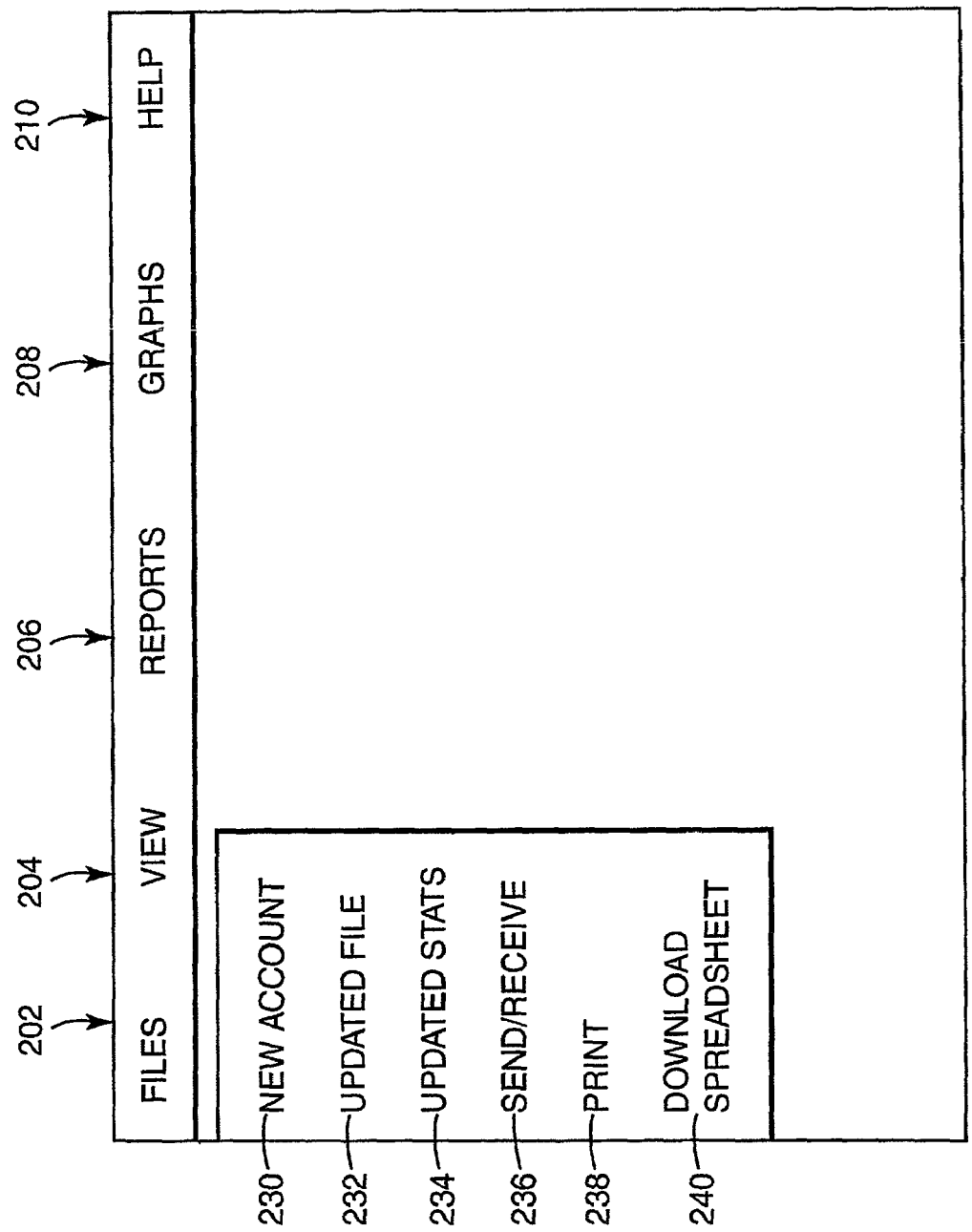
FIG. 11 is a diagram illustrating another exemplary embodiment of a user interface used in an information trading system according to the present invention.

FIG. 11 illustrates one exemplary embodiment of a pull-down menu for FILE menu 202. By selecting FILE menu 202 (e.g., via positioning a mouse at file menu 202 and clicking), a pull-down menu is presented to the user. In the exemplary embodiment shown, the pull-down menu for FILE menu 202 includes the following selections: NEW ACCOUNT selection 230, UPDATED FILE selection 232, UPDATED STATS selection 234, SEND/RECEIVE selection 236, PRINT selection 238 and DOWNLOAD SPREADSHEET selection 240.

Similar pull-down menus are available by selecting VIEW menu 204, REPORTS menu 206, GRAPHS menu 208 or HELP menu 210.

For example, upon selecting NEW ACCOUNT 230 the user is presented with new account graphical user interface templates for providing information to the centralized information exchange system 32. FIGS. 12-15 illustrate exemplary embodiments of graphical user interface templates directed to private company financial statement and private company transaction templates.

Figure 12:
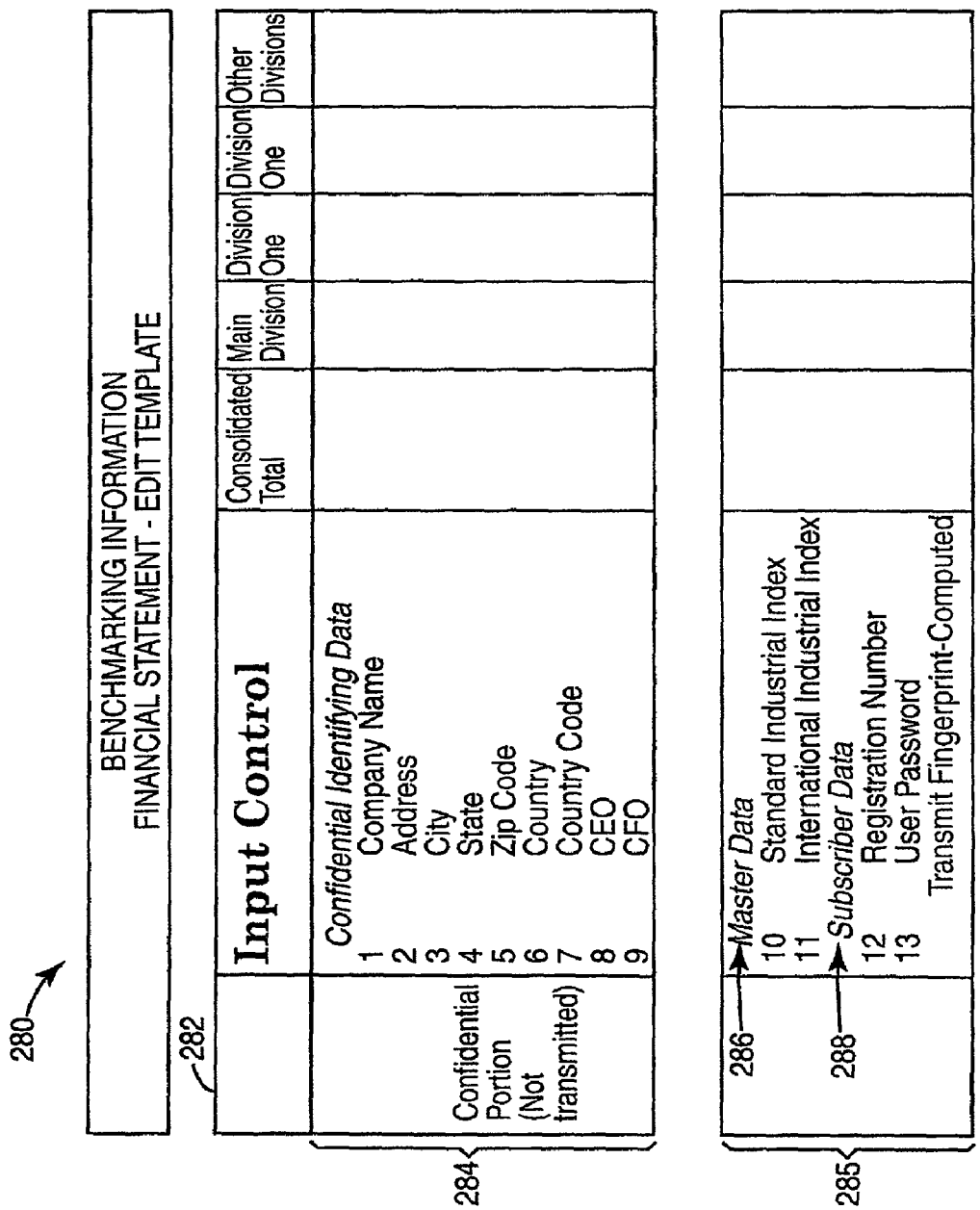
FIG. 12 is a diagram illustrating one exemplary embodiment of a confidential portion of a graphical user interface private company template used in an information trading system according to the present invention.

FIG. 12 illustrates one exemplary embodiment of the confidential portion and access data (including subscriber data) portion of a private company financial statement template at 280. The template 280 allows for the entry of private company information for companies ranging from very small to very large, as indicated by the headings 282, which allows for a Consolidated Total, Main Division, Division 1, Division 1 and Other Divisions headings. The private company financial statement confidential portion includes confidential identifying data 284. The confidential identifying data 284 includes the following fields: Company Name, Address, City, State, Zip Code, Country, Country Code, CEO Name, and CFO Name.

One exemplary embodiment of subscriber data is also illustrated. Access data 285 includes subscriber data 288 and master data or groupings 286. The Master Data 286 includes the entry of information which may be utilized in grouping the private company information. In the example shown, the master data selection 286 includes a Standard Industrial Index Field and an International Industrial Index Field. Subscriber data 288 is used as part of a login routine by the user between the user interface and the centralized information exchange system 32. In the exemplary embodiment shown, Subscriber Data 288 includes a unique previously designed Registration Number and User Password. The Registration Number and User Password are transmitted as a digital fingerprint to the centralized information exchange system 32 and must be verified before allowing communication between the user interface and the centralized information exchange system 32.

FIG. 13 is a diagram illustrating one exemplary embodiment of the exchange portion of a graphical user interface private company financial statement template, indicated generally at 300. The template 300 includes headings for Input Control, Consolidated Total, Main Division, Division 1, Division 1 and Other Divisions at 302. In the example shown, the exchange portion includes entry fields for Deal-Based Operating Data 304, Book Value-Financials Acquired-Sold Company 306, Transaction Data 308, and Asset Deal 310. In one exemplary embodiment, the deal-based operating data 304 includes entries for sales/revenue and EBITDA. The Book Value-Financials Acquired-Sold Company 306 includes entries for assets, payables-accruals, bank debt or secured debt, all other amortizing debt, all other debt and book value of fixed equity instruments. The Transaction Data 308 includes entries for whether the transaction was a stock or paper deal, common paper, common shares outstanding, shares bought or sold, price paid per share or amount paid for common percent of common acquired, whether fixed equity instruments percentage of book was 100%, if less than 100%, amount paid for face instrument, all debt excluding trade payables and accruals where the percentage of book was 100%, and if less than 100% amount paid for face instrument. The Asset Deal 310 includes entries for deal basis, financing structure and computed post-acquisition enterprise value.

In a similar manner, FIG. 14 illustrates one exemplary embodiment of a graphical user interface private company transaction template, indicated generally at 350. The transaction template 350 includes field headings 352, including Input Control, Consolidated Total, Main Division, Division 1, Division 1 and Other Divisions. The confidential portion includes Confidential Identifying Data 354. Access data portion 359 includes Master Data 356 and Subscriber Data 358. The exchange portion 361 includes Operating Data 360, Assets & Working Capital 362 and Financing 368. The Operating Data 360 includes entries for sales/revenues, gross profit, operating profit, depreciation, amortization, CO compensation and property rents. The Assets & Working Capital 362 includes entries for assets, accounts receivable, inventories, equipment (net), intangibles, and payables & accruals. The Financing 368 includes entries for interest bearing debt, other debt, other equity and equity invested. Other suitable public company and private company templates will become apparent to those skilled in the art after reading the present application.

FIG. 15 is a diagram illustrating one exemplary embodiment of statistics maintained at the centralized information exchange system 32 based on predetermined statistical models. The private company statistics include industry average deal and valuation statistics 382, industry average collateral statistics 384, industry average operating performance data 386, and industry average asset management data statistics 388. The statistics are further broken down as shown. The statistics are further sorted or "grouped" by SIC codes and NAICS codes, and by three sales and asset levels and by six geographical regions within the United States. Also, the statistics may be grouped by statistics obtained from qualified users or non-qualified users.

FIGS. 16-20 are flow diagrams illustrating exemplary embodiments of a method of trading information according to the present invention. Reference is also made to previously detailed FIG. 1 through FIG. 15.

Figure 16:
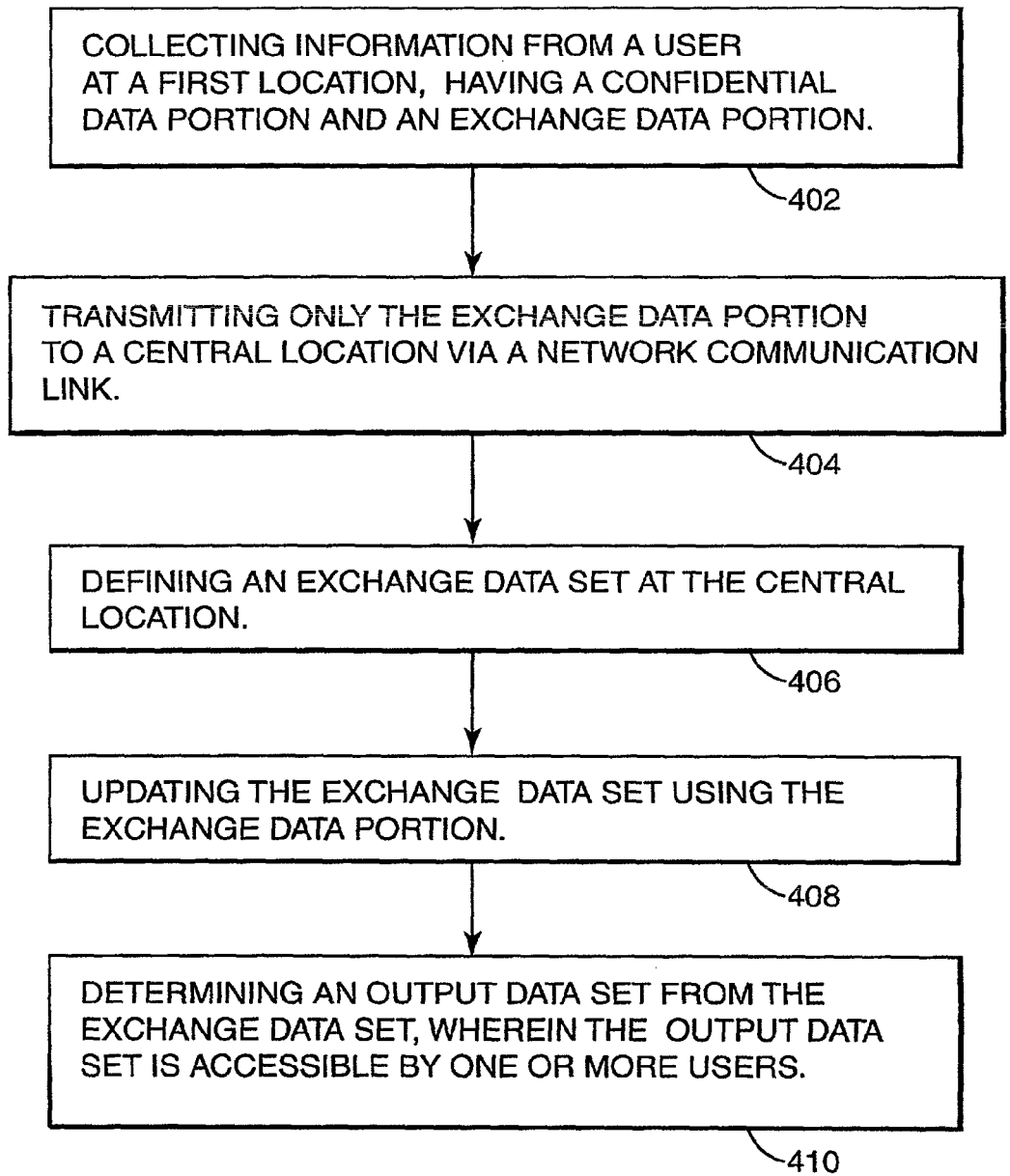
FIG. 16 is a flow diagram illustrating one exemplary embodiment of a method of trading information according to the present invention.

FIG. 16 is a flow diagram illustrating one exemplary embodiment of trading information according to the present invention. In step 402, information is collected from a user at a first location. The collected information has confidential data portion and an exchange data portion. In step 404, only the exchange data portion is transmitted to a centralized information exchange system via a network communication link. In step 406, an exchange data set is defined at the centralized information exchange system. In step 408, the exchange data set is updated using the exchange data portion. In step 410, an output data set is determined from the exchange data set, wherein the output data set is accessible by one or more users. The users may be qualified users.

Figure 17:
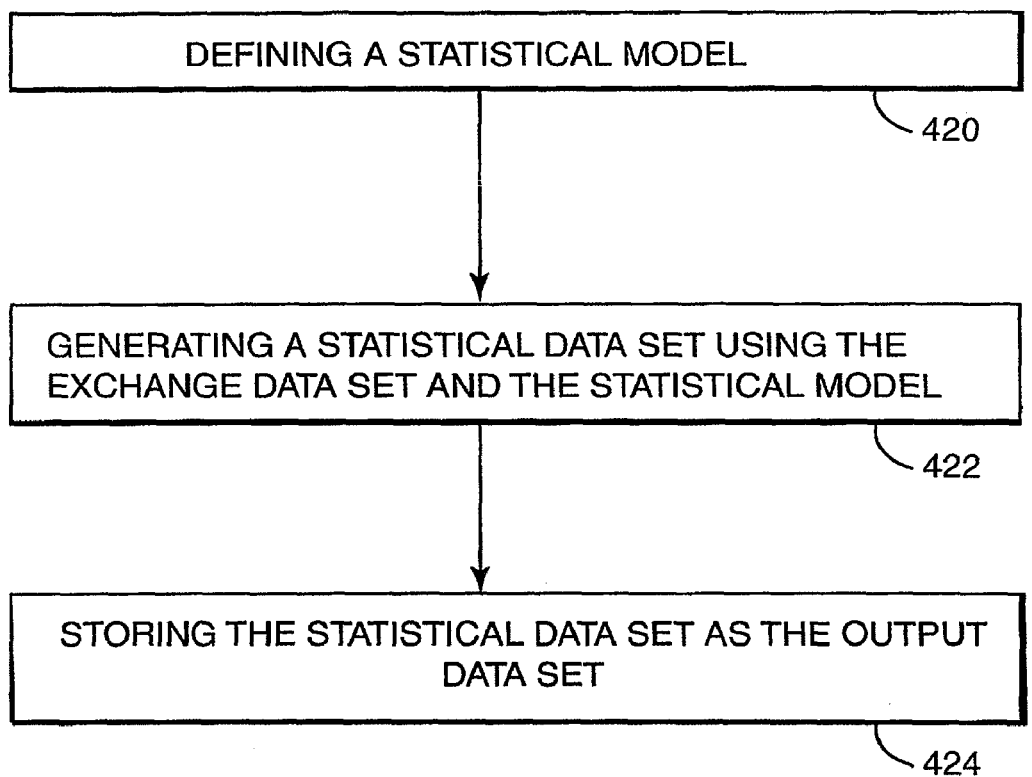
FIG. 17 is a flow diagram illustrating another exemplary embodiment of a method of trading information according to the present invention.

FIG. 17 is a flow diagram further illustrating the step of determining the output data set. In step 420, a statistical model is defined. In step 422, a statistical data set is generated using the exchange data set and the statistical model. In step 424, the statistical data set is stored as the output data set.

Figure 18:
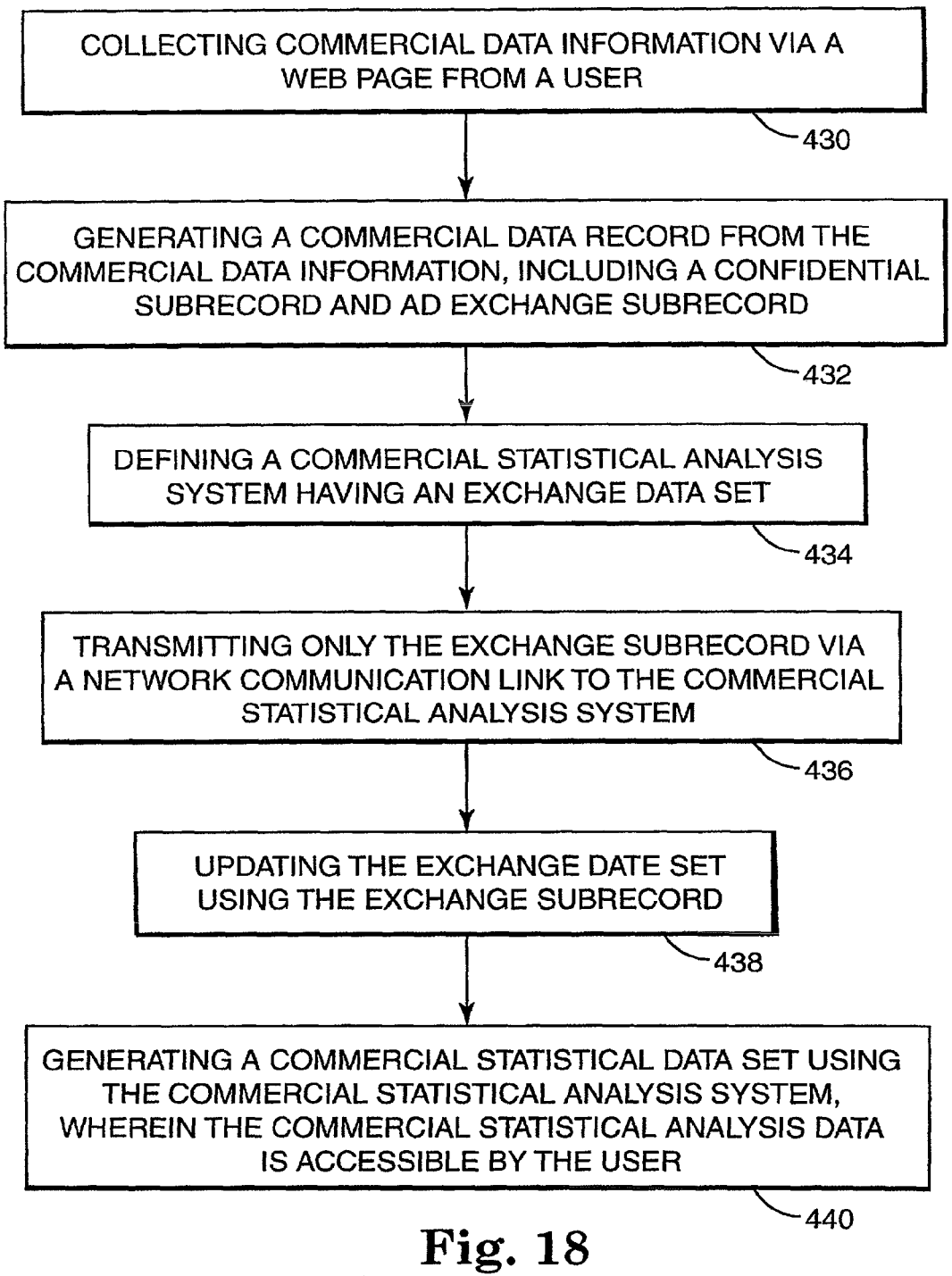
FIG. 18 is a flow diagram illustrating another exemplary embodiment of a method of trading information according to the present invention.

FIG. 18 is a flow diagram illustrating another exemplary embodiment of a method of trading information according to the present invention. The method includes the step of collecting commercial data information via a webpage from a user at step 430. In step 432, a commercial data record is generated from the commercial data information, including a confidential subrecord and an exchange subrecord. In step 434, a commercial statistical analysis system is defined having an exchange data set. In step 436, only the exchange subrecord is transmitted via a network communication link to the commercial statistical analysis system. In step 438, the exchange data set is updated using the exchange subrecord. In step 440, a commercial statistical data set is generated using the commercial statistical analysis system. The commercial statistical analysis data is accessible by the user.

Figure 19:
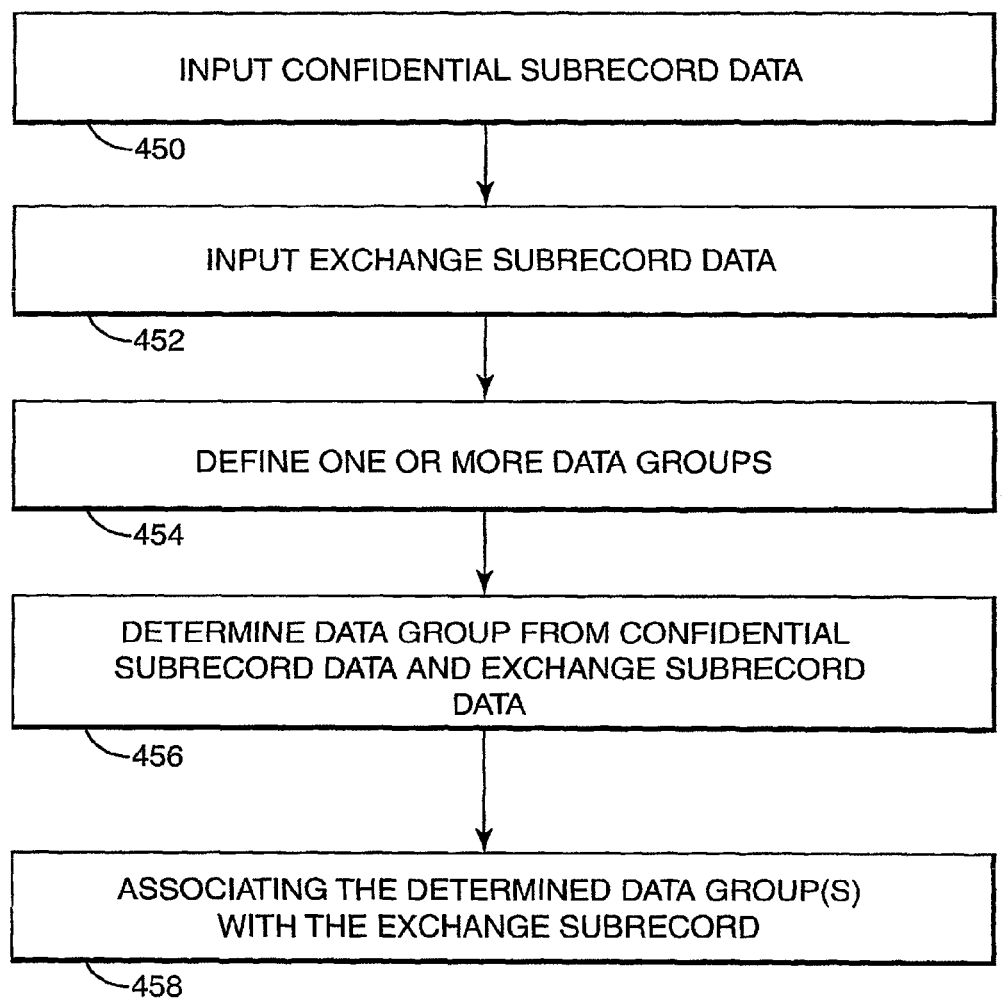
FIG. 19 is a flow diagram illustrating another exemplary embodiment of a method of trading information according to the present invention.

FIG. 19 is a flow diagram further illustrating one exemplary embodiment of collecting information from a user. The method includes the step of inputting confidential subrecord data at 450. In step 452, exchange subrecord data is input. In step 454, one or more data groups are defined. In step 456, the data group(s) is determined from confidential subrecord data and exchange subrecord data. In step 458, the determined data group(s) is associated with the exchange subrecord.

Figure 20:
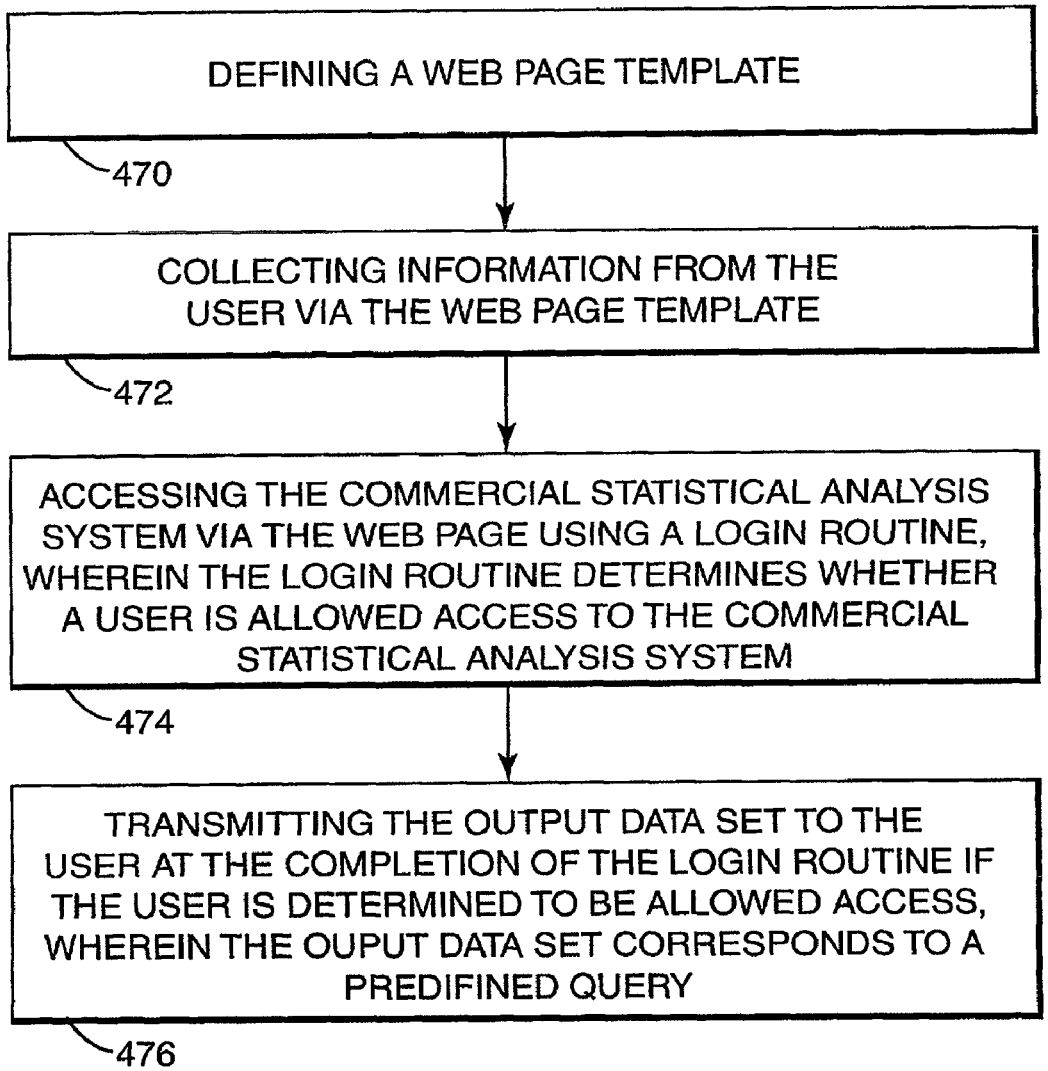
FIG. 20 is a flow diagram illustrating another exemplary embodiment of a method of trading information according to the present invention.

FIG. 20 is a flow diagram illustrating one exemplary embodiment of a login routine used in the method of trading information according to the present invention. In step 470, a webpage template is defined. In step 472, information is collected from the user via the webpage template. In step 474, the commercial statistical analysis system is accessed via the webpage using a login routine, wherein the login routine determines whether a user is a user. In step 476, the output data set is transmitted to the user at the completion of the login routine if the user is determined to be a user, wherein the output data set corresponds to a predefined theory.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer implemented method for trading information related to commercial companies via a communication network, the method comprising the acts of:
    collecting, at a central computing system, non-confidential exchange data, wherein collecting non-confidential exchange data includes collecting benchmark information, wherein the benchmark information includes at least one of asset information, public business valuation information, private business valuation information, portfolio information, capital structure information, and performance information;
    providing an interface over the communication network displayed on a host computer at the first user location;
    receiving from the host computer the non-confidential exchange data from private company information generated on a host computer at the first user location, wherein the private company information includes non-confidential data and confidential data, and wherein generation of the non-confidential exchange data includes transforming the confidential data into classification information associated with the non-confidential data based, at least in part, on a type of product or service offered by the private company, and wherein receiving from the host computer the non-confidential data includes receiving only the non-confidential exchange data from the private company information, at the central computer system wherein the non-confidential exchange data contains no confidential data; and
    generating on the central computer system output data, based, at least in part, on any collected non-confidential exchange data; and
    transmitting at least a portion of the output data over the communication network.

2. The method of claim 1, wherein the method further comprises
    defining, by the interface one or more groups; and
    determining, by the interface, one or more groups associated with the private company information.

3. The method of claim 2, wherein the method further comprises attaching by the interface the determined groups to the non-confidential exchange data.

4. The method of claim 2, wherein the method further comprises determining by the interface the one of more groups associated with the private company information based, at least in part, on the confidential data.

5. The method of claim 1, further comprising the step of defining the first user as a qualified user.

6. The method of claim 5, further comprising the step of defining the non-confidential exchange data collected from the first user as qualified exchange data.

7. The method of claim 1, wherein the method further comprises storing, by the interface, the private company information at the first location.

8. The method of claim 1, wherein the method further comprises storing, by the interface, any confidential data at the first location.

9. The method of claim 1, wherein the step of generating the output data further comprises the acts of:
    defining a statistical model;
    generating the output data using the collected non-confidential exchange data and the statistical model; and
    storing the output data.

10. The method of claim 9, further comprising acts of:
    collecting non-confidential exchange data from a second user at a second user location; and
    providing the interface over the communication network to the second user.

11. The method of claim 1, wherein the act of providing the interface over the communication network further includes the acts of:
    providing a graphical user interface displayed as part of a webpage; and
    providing for collection of information from the first user location via the webpage displayed at the first user location.

12. The method of claim 11, further comprising the step of:
    providing for access to the central computer via the webpage using a login routine, wherein the login routine determines whether a user is allowed to access the central controller.

13. The method of claim 1, wherein the output data contains statistical averages for a commercial industry.

14. The method of claim 13, wherein the statistical averages include at least one of average deal statistics, average valuation statistics, average collateral statistics, average operating performance statistics, and average operating performance data.

15. The method of claim 1, further comprising an act of requiring the user submit non-confidential exchange data prior to permitting the user to access any output data.

16. The method of claim 1, wherein the output data permits the user to determine a value for a respective private company.

17. A system for trading commercial information via a network, the system comprising:
    a central computer server configured to receive non-confidential exchange data from a host computer system at a first user location wherein the non-confidential exchange data includes benchmark information, wherein the benchmark information includes at least one of asset information, public business valuation information, private business valuation information, business valuation information, portfolio information, capital structure information, and business performance information;

interface provided from the central computer server configured to:

display on the host computer;

generate the non-confidential exchange data from private company information on the host computer at the first user location, wherein the private company information includes non-confidential data and confidential data, and wherein generation of the non-confidential exchange data includes transforming the confidential data into classification information associated with the non-confidential data based, at least in part, on a type of product or service offered by the private company, and communicate only the non-confidential exchange data from the private company information to a central computer system, and wherein the non-confidential exchange data contains no confidential data; and a modeling component configured to generate output data, based, at least in part, on any collected non-confidential exchange data; and a communication component configured to transmit at least a portion of the output data to a user over the communication network.

18. The system of claim 17, wherein the user interface is further configured to:

define one or more groups for company information; and determine one of more groups associated with the private company information.

19. The system of claim 18, wherein the user interface is further configured to attach the determined groups to the non-confidential exchange data.

20. The system of claim 17, wherein the central computer system is further configured to require the user submit non-confidential exchange data from a respective private company information prior to permitting the user to access the output data.

21. The system of claim 17, wherein the output data permits the user to determine a value for a respective private company.

22. The system of claim 17, wherein the output data contains statistical averages for a commercial industry.

23. The method of claim 1, wherein the output data includes at least one of performance and valuation data.

* * * * *